US008888156B2

(12) United States Patent
David

(10) Patent No.: US 8,888,156 B2
(45) Date of Patent: Nov. 18, 2014

(54) HANDLING TOOL, FOR SECURE HANDLING OF CONNECTORS OF ELECTROLYSIS CELLS INTENDED FOR ALUMINIUM PRODUCTION

(75) Inventor: Stéphane David, Lomme (FR)

(73) Assignee: E.C.L., Ronchin (FR)

( * ) Notice: Subject to any disclaimer, the term of this patent is extended or adjusted under 35 U.S.C. 154(b) by 0 days.

(21) Appl. No.: 13/821,422

(22) PCT Filed: Sep. 6, 2011

(86) PCT No.: PCT/FR2011/000492
§ 371 (c)(1), (2), (4) Date: Mar. 7, 2013

(87) PCT Pub. No.: WO2012/032234
PCT Pub. Date: Mar. 15, 2012

(65) Prior Publication Data

US 2013/0181468 A1 Jul. 18, 2013

(30) Foreign Application Priority Data

Sep. 8, 2010 (FR) ...................................... 10 03568

(51) Int. Cl.
*B25J 15/00* (2006.01)
*C25C 3/10* (2006.01)
*B66C 1/42* (2006.01)
*C25C 3/16* (2006.01)

(52) U.S. Cl.
CPC .... *B66C 1/42* (2013.01); *C25C 3/16* (2013.01)
USPC ........................................ 294/197; 294/82.33

(58) Field of Classification Search
USPC ................ 294/197, 104, 110.1, 82.19, 82.33, 294/82.34
See application file for complete search history.

(56) References Cited

U.S. PATENT DOCUMENTS 3,167,345 A * 1/1965 Dukes ........................ 294/82.31
3,434,955 A * 3/1969 Duclaux ........................ 204/225
3,625,558 A * 12/1971 Johnson ..................... 294/82.31

(Continued)

FOREIGN PATENT DOCUMENTS

EP 1876265 A2 1/2008
FR 2039543 A5 1/1971
FR 2854906 A1 11/2004

OTHER PUBLICATIONS

International Search Report mailed Oct. 31, 2011 (PCT/FR2011/000492); ISA/EP.

*Primary Examiner* — Dean Kramer
(74) *Attorney, Agent, or Firm* — Banner & Witcoff, Ltd

(57) ABSTRACT

A handling device includes at least a guiding member having a notch associated with two side trunnions and designed to receive a trunnion, the handling device also including a gripping member the guiding member and the gripping member cooperating in such a manner that, when the gripping member is in an open position, each trunnion can be inserted into or extracted from the notch, and when the gripping member is in a closed position, each trunnion can only move a limited distance in the notch, between a "low" position and a "high" position, an actuating system associated with the gripping member, able to move it between the open and closed positions, and a locking system that is able to block said gripping member when a locked position, and able to move from the locked position to an unlocked position when the are in the high position.

18 Claims, 6 Drawing Sheets

(56) References Cited

U.S. PATENT DOCUMENTS 3,627,670 A 12/1971 Duclaux
4,609,219 A * 9/1986 Go ............................ 294/82.24
5,114,200 A * 5/1992 Visnyouszky et al. ..... 294/81.56
7,344,625 B2 3/2008 Delescluse
2005/0266735 A1 12/2005 Delescluse
2006/0290153 A1* 12/2006 Delescluse .................... 294/115

* cited by examiner

A)

B)

HANDLING TOOL, FOR SECURE HANDLING OF CONNECTORS OF ELECTROLYSIS CELLS INTENDED FOR ALUMINIUM PRODUCTION

The present application is a U.S. National Phase filing of International Application No. PCT/FR2011/000492, filed on Sep. 6, 2011, designating the United States of America and claiming priority to French Patent Application No. 1003568, filed Sep. 8, 2010, and the present application claims priority to and the benefit of both of the above-identified applications, which are incorporated by reference herein in their entireties.

The invention relates to handling equipment used in aluminium production plants using igneous electrolysis by means of the Hall-Héroult process. It more particularly relates to devices for handling connectors which ensure the fastening and electrical contact of the anodes on the anode frame.

Metallic aluminum is produced industrially by igneous electrolysis, namely by electrolysis of alumina in solution in a molten cryolite bath, known as an electrolyte bath, using the well-known Hall-Héroult process. The electrolyte bath is contained in tanks, called "electrolysis tanks", comprising a steel container, which is coated on the inside with refractory and/or insulating materials, and a cathodic unit located at the bottom of the tank. Anodes, typically made of carbonaceous material, are partially immersed in the electrolyte bath. The assembly formed by an electrolysis tank, its anodes and the electrolyte bath is called an electrolysis cell.

The anodes are provided with a metal stem for the electrical and mechanical connection to a metal framework, called an anode frame, which is mobile in relation to a fixed gantry placed above the electrolysis tank. The anode stems are connected to the anode frame using movable connectors that can be placed on support hooks located on either side of the anode rods and which can be maneuvered to pin the anode rods against the anode frame. French patent FR 2 039 543 (corresponding to U.S. Pat. No. 3,627,670) describes such devices, which have a tightening screw, the actuation of which allows the connector to be placed in tightened configuration, where it pins the anode rod against the anode frame thus ensuring electrical contact, and in a loosened configuration where it can be removed to enable disconnection from the anode rod.

When in operation, an electrolysis plant requires servicing work on the electrolysis cells, including the replacement of worn anodes by new anodes. In order to carry out this servicing work, plants are generally equipped with at least one lifting and handling unit comprising an overhead crane which can be moved above and along the electrolysis cells, and a carriage provided with several handling and servicing devices (often called "tools"). Such a lifting and handling unit may, in particular, be equipped with a device for handling connectors, notably their placement, removal and transport, such as the connector described in French patent FR 2 039 543.

It may occur, however, that the connectors are not properly seized by these handling devices, and this may lead to the connector being dropped accidentally, typically during its transport or during its placement on the support hooks. In its U.S. Pat. No. 7,344,625, the applicant proposed a handling device for single anode connectors of compact design. This handling device is designed to place, remove and transport an anode connector equipped with two side trunnions and a tightening screw, such as that disclosed by U.S. Pat. No. 7,344,625 and again illustrated in FIGS. 3A and 3B. This handling device comprises a tightening device that cooperates with the tightening screw so as to modify the tightening state of the connector and a locking system that cooperates with said tightening device so as to maintain the connector in a determined position in the handling device when the connector is loosened means of the tightening device. This handling device further comprises two mobile members having an open position and a closed position, and capable of supporting the conductor when it is in the closed position and when, by accident, the connector is not or is no longer retained by the locking system.

In this device, the mobile members pass from one position to another under the action of cams that cooperate with the upper surface of the support hooks during the vertical descending movement of the handling device. In practice, these mobile members are subjected to frequent impacts and become easily bent or twisted, such that they become stuck or close and that their extremity no longer passing below the trunnions, they end up no longer being able to perform the role of safety support in the event the connector would no longer be retained by the locking system. This requires numerous maintenance inspections of this device which results in frequent replacement of said mobile members. To void these drawbacks, the applicant decided to develop a connector handling device that is sturdier and more reliable.

The subject of the invention is a handling device designed in particular to ensure reliable and durable transport of an electrolysis cell anode connector, the placement and fastening of the anode connector on an anode frame in order to ensure electrical contact between the anode stem and the anode frame, or its removal, the handling device being arranged so that the risk of accidental dropping of said connector during its handling is as low as possible.

A first purpose of the invention is a device for handling a connector to connect an anode stem onto the anode frame of an aluminium production plant using igneous electrolysis, said connector being equipped with two side trunnions able to cooperate with support hooks interdependent with said anode frame and placed on either side of the anode stem, so as to pin said anode stem against said anode frame, said handling device comprising at least a guiding device having a notch associated with each of said trunnions and designed to receive said trunnion, said handling device being characterized in that it also includes:

- at least a gripping member, having an open position and a closed position, said guiding device and said gripping member cooperating in such a manner that, when said gripping member is in open position, each trunnion can be inserted into or extracted from said notch, and when said gripping member is in closed position, each trunnion can only move a limited distance in said notch, between a so-called "low" position, corresponding to the contact with said gripping member and a "high" position;
- an actuating system associated with said gripping member, able to move it between said open and closed positions,
- at least a locking system, having a locked position and an unlocked position, that is able to block said gripping member when in locked position, able to move from the locked position to the unlocked position when said trunnions are in high position.

The arrangement of the gripping member and the locking system is such that:

a) when said handling device is equipped with a connector and moves in order to place it on the support hooks of the anode frame, the locking system is in locked position and blocks the gripping member in closed position, trapping the trunnions of the connector. By gravity, the trunnions are in low position, in contact with the gripping member, which is advantageously equipped with concavities able to form a seat on which a trunnion can rest. Upon arriving above the support hooks, the handling device is lowered until the trunnions rest on said support hooks. While continuing the descent of the gripping member, the trunnions lose contact with said gripping member and move into the notch until their reach their high position where, for example upon entraining a moving part interdependent with the locking system, they pass said locking system from its locked position to its unlocked position, thus enabling said gripping member to move into its open position. Once the actuating system has been implemented to place the gripping member in open position, the handling device, typically interdependent with a service machine, is driven by a rising vertical movement and released from the connector that it was transporting.

b) when said handling device is empty and is moved in order to grasp a connector resting on the support hooks of the anode frame and to extract it from this position, the gripping member is maintained in open position. Upon arriving above the connector, which rests on the support hooks, the handling device is lowered until the trunnions are introduced into said notches and reach their high position where, for example by driving a moving part interdependent with said locking system, they pass said locking system to the unlocked position, thus enabling said gripping member to move from its open position to its closed position to trap said trunnions. The handling device is raised so that the trunnions are in low position, which correspond to the contact with said gripping member. While continuing the upward movement, the connector is driven by the gripping member, the trunnions remaining on contact with the gripping member, typically by gravity, resting on concavities of said gripping member forming seats for said trunnions.

In contrast to the handling device described in U.S. Pat. No. 7,344,625, the locking of the connector in the handling device is not dependent on the tightening-loosening device of the connector, and thus may be used to handle connectors of different types, for example which do not require actuation of a tightening screw. However, the preferred embodiment of the invention, designed to handle connectors equipped with a tightening screw, is also equipped with a tightening/loosening device of the tightening screw of the connector, the later not necessarily being associated with the locking system of the connector.

The mobile members of U.S. Pat. No. 7,344,625, which are used as safety supports by the trunnions, are replaced here by a gripping member designed to be used as a "permanent" support for said trunnions when they are in low position in the notches of said handling device. The gripping member is moved between its open position and its closed position by means of autonomous actuating system. In this manner, the movement of the gripping member, which is no longer dependent on the action of cams cooperating with the upper surface of the hooks, can be made regardless of the condition, worn or deformed, of said gripping member.

Moreover, the gripping member is associated with a locking system that can unlock—enabling the handling device to pass from its closed position to its open position—only if the trunnions of the connector, introduced into the notches, are located in high position. The locking system comprises a moving part designed to move between two positions: an unlocked position, where the gripping member is free to move and a locked position, where it prevents movement of the gripping member, in the direction of its open position if it is in closed position and in the direction of its closed position if it is in open position. Advantageously, the unlocked position is reached by said moving part when it enters into contact with a trunnion and is driven by said trunnion in its travel toward its high position. This moving part may move by pivoting around a pin interdependent with the handling device of the connector or by being guided in translation by a sliding type connection.

Advantageously, said locking system is associated with an actuator which, when said trunnion is not in high position, moves said moving part from its unlocked position to its locked position. Thus, as soon as the trunnion is no longer in high position, the locking system is in its locked position, which prevents the untimely opening or closing of the gripping member. Said actuator is an elastic means, typically a compression spring, the stiffness of which is sufficiently weak so that the mobile part of the locking system can be driven by said trunnion in its movement toward its high position.

In normal operation, the high position of the trunnions can only be reached by downward movement of the handling device, the connector being fixed, typically resting on the support hooks of the anode frame.

Advantageously, the actuating system of the gripping member is a cylinder, typically pneumatic, comprising a rod, the two extremities of travel of which correspond to said open position and said closed position, respectively. Advantageously, position sensors are provided to identify the position of the moving part of the locking system, so as to prevent implementation of the actuating system when the locking system is in locked position (redundant safety).

In a preferred embodiment of the invention, the gripping member comprises two flanges, each associated with a trunnion and driven by the same actuating system. Furthermore, the locking system advantageously includes two locking devices, each associated with a trunnion.

Said gripping member is advantageously a pivoting member, preferably a set of pivoting flanges, the exterior contour of which, in a plane perpendicular to the pivot axis, presents a tongue or groove type relief, which cooperates with a relief of the locking system, and a relief, which forms an obstacle at the entrance of the notch, when said gripping member is in closed position, and which typically features a concavity able to form a seat on which the trunnion can rest. The overall C- or L-shapes are well adapted to this pivoting member although other more compact shapes, such as those presented in example 4, may also be suitable.

The moving part of the locking system is advantageously equipped with two partitions which, when said moving part is in locked position, form stops that halt the movement of said relief of the gripping member: an opening stop partition which counters the movement of said relief when said gripping member must pass from its closed position to its open position and a closure stop partition which counters the movement of said relief when said gripping member must pass from its open position to its closed position.

Another subject of the invention is a lifting and handling unit comprising at least a connector handling device according to the invention.

Another subject of the invention concerns the use of the handling device according to the invention in a plant for the production of aluminum by igneous electrolysis.

Another subject of the invention concerns the use of the lifting and handling unit according to the invention in a plant for the production of aluminum by igneous electrolysis.

The invention shall be better understood with the help of the detailed description of the preferred embodiments of the invention and are illustrated in the figures enclosed in the appendices.

FIGS. 4*a* to 4*d* are side views of a first connector handling device according to the invention, with its mounting plate.

FIGS. 5*a* to 5*d* are side views of a second connector handling device according to the invention.

FIGS. 6*a* to 6*d* are side views of a third connector handling device according to the invention.

FIGS. 7*a* to 7*d* are side views of a fourth connector handling device according to the invention.

Figure 1:
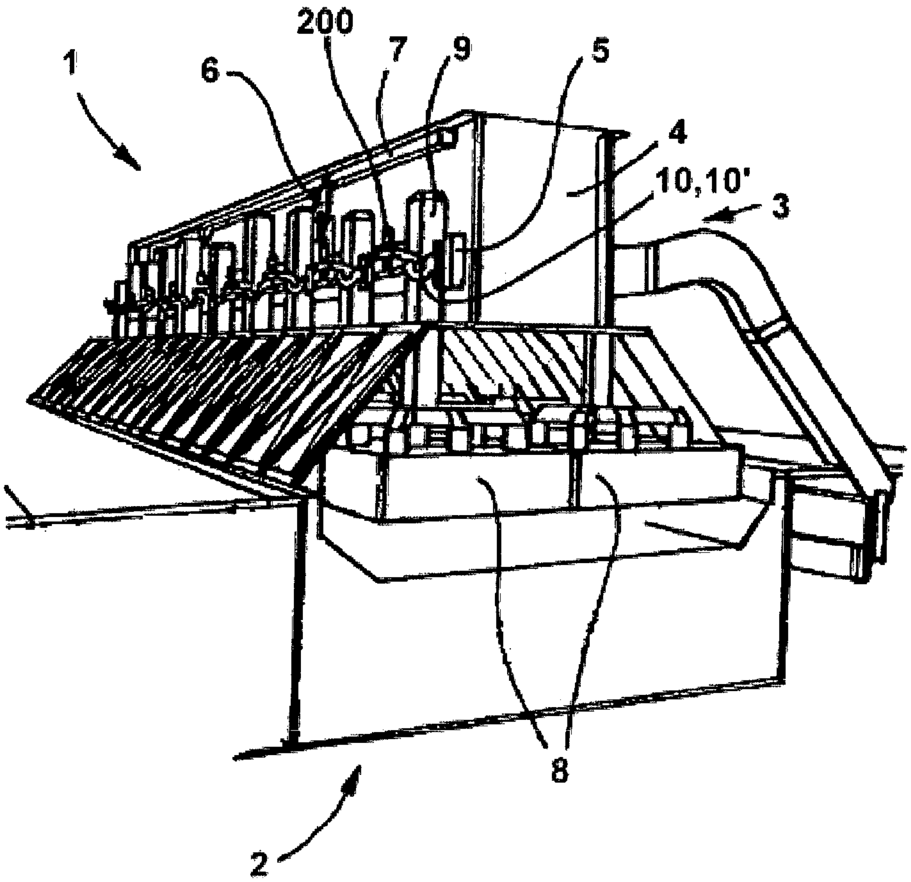
FIG. 1 is a perspective view of a typical electrolysis cell, designed for aluminium production.

Electrolysis plants designed to produce aluminium include one or more electrolysis halls (100) comprising a large number of electrolysis cells (1) normally arranged in rows or lines (typically side by side or head to head), each row or line typically comprising one hundred or several hundreds of cells. As illustrated in FIG. 1, an electrolysis cell (1) includes a tank (2), able to contain the liquid metal and the electrolyte bath, a superstructure (3) and anodes (8), typically prebaked anodes. The superstructure (3) comprises a fixed gantry (4) and a mobile metal anode frame (5). The anodes (8) are equipped with a metal stem (9) designed to secure and electrically connect anodes (8) to the anode frame (5). The superstructure (3) also comprises at least a cylinder (not illustrated) coupled to the anode frame (5) by connecting rods (6) and levers (7). The anode frame (5) can be moved vertically (upward or downward) when acted upon by the cylinder(s).

Figure 3:
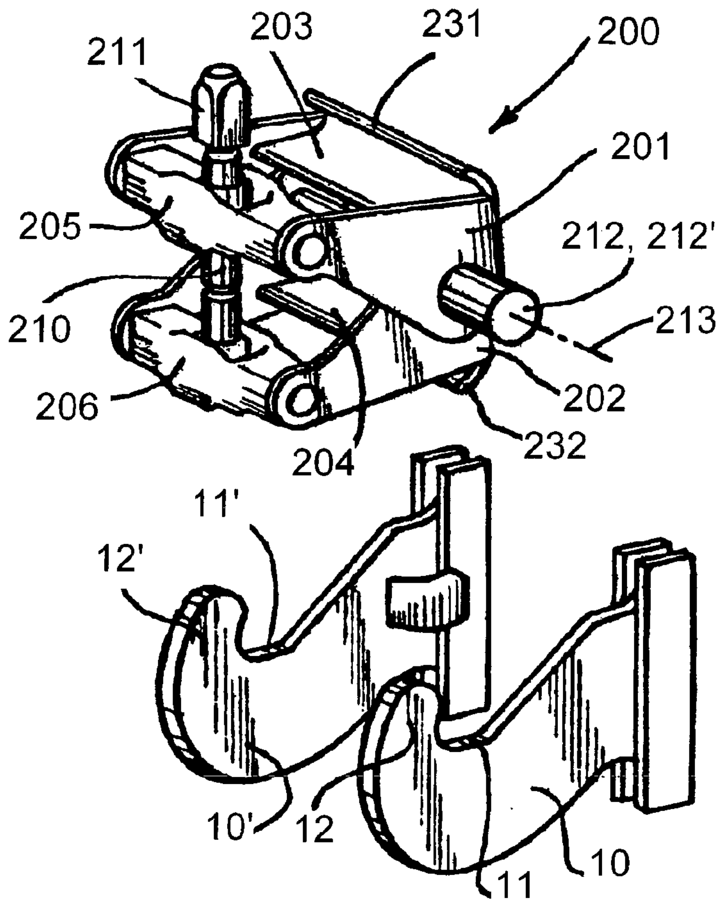
FIG. 3A is a perspective view of an anode connector and support hooks of said connector (the anode frame to which they are attached is not illustrated).
FIG. 3B illustrates this same connector in place on the support hooks to pin the anode stem (not illustrated) against said anode frame.
Figure 3:
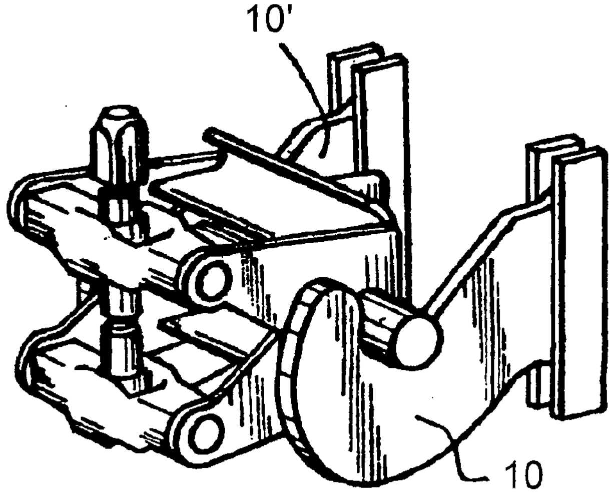

The anode rods (9) are secured to the anode frame (5) by connectors such as those illustrated in FIG. 3A. This connector (200) features two levers (201, 202) able to pivot around a common axis (213), tightening means (205, 206, 210, 211) to pivot said levers (201, 202) and two side trunnions (212, 212') arranged on each side of the connector. The side trunnions (212, 212') generally form the common axis (213) and are typically comprised of the ends of a rod that passes completely through the connector. Said trunnions (212, 212') are designed to reset in the throat (11, 11') of the hooks (10, 10') fastened to the anode frame (5) and located on either side of each anode stem (9).

A connector (200) has at least a first state, referred to as the tightened state, and a second state, referred to as the loosened state. When a connector (200) is installed in fastening hooks (10, 10'), as illustrated in FIG. 3B, the tightening state enables either the anode stem (9) to be fastened to the anode frame (5), or to release the anode stem (9): in the tightened state, the connector (200) applies pressure against the anode stem (9) and the plate on the anode frame (5); in the loosened state, the connector (200) no longer applies pressure against the anode stem (9), such that the connector and anode can be removed.

A connector (200) can pass between the two tightening states by actuating tightening means (205, 206, 210, 211). These means typically include a screw (210) able to cooperate with an external tightening member, generally fixed to a handling device (300). The tightening screw (210) is typically equipped with a head (211) that can be inserted into the tightening member, which is actuated by tightening or loosening the connector (200). The tightening means equally include nuts (205, 206) fastened to levers (201, 202) of the connector, preferably in a mobile manner, and able to cooperate with the screw (210) so as to allow the pivoting of the levers (201, 202) and the tightening/loosening of the connector (200). The levers (201, 202) of a connector (200) generally comprise cross members (203, 204) designed in particular to communicate, directly or indirectly, the tightening pressure of the connector against the anode rods.

Figure 2:
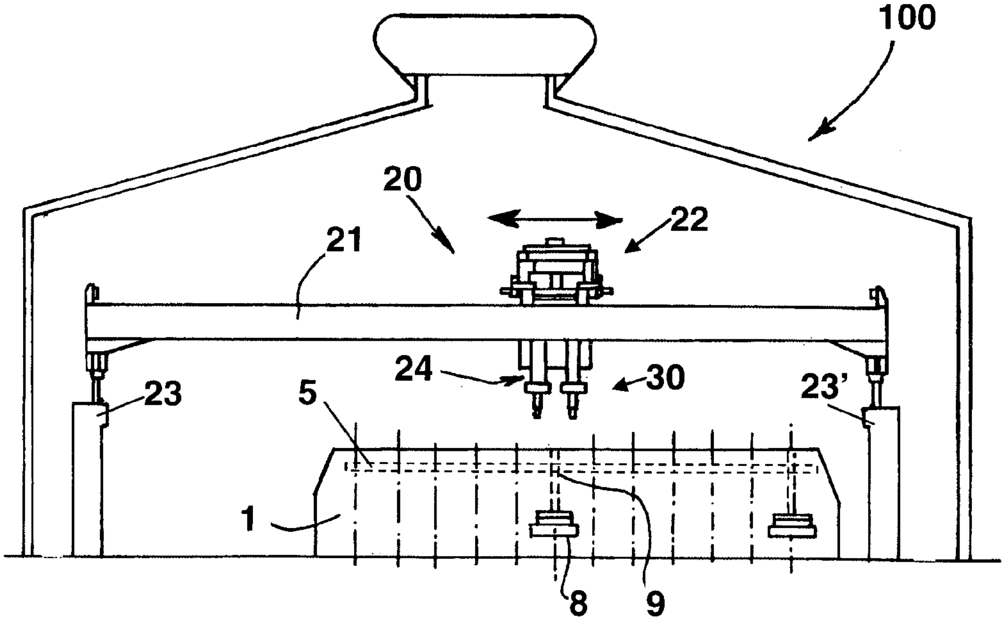
FIG. 2 is a cross-sectional view of a typical electrolytic hall designed to produce aluminium.

As illustrated in FIG. 2, the electrolysis halls (100) generally comprise at least one lifting and handling unit, referred to as the "service machine" (20), and referred to hereafter by the abbreviation "SM". Said unit (20) typically includes a traveling crane (21) that can be moved along the electrolysis cells on crane runways (23, 23'), a trolley (22) able to move on the traveling crane (21), and handling and servicing devices (30), often referred to as "tools", such as a device (300) for handling anode connectors (200). The handling device (300) typically includes a plate (301) mounted to the end of a mobile vertical arm (24), for example the last segment of a telescopic arm, itself interdependent with a tool-holder turret pivoting around a vertical axis interdependent with the trolley (22).

Examples 1 to 4 illustrate four embodiments of the connector handling device according to the invention, that essentially differ by the shape given to the gripping member and by the locking system.

EXAMPLE 1

FIGS. 4*a* to 4*d*

The first example is a connector handling device (300) which is mounted on the end of a telescopic arm by means of a mounting plate (301). Said handling device includes a guiding member (30) which has a notch (40) associated with each of said trunnions and into which said trunnion is intended to move.

The handling device also includes a gripping member (31), which has an open position and a closed position. The guiding member (30) and the gripping member (30) cooperate such that:

- when the gripping member (31) is in open position, each trunnion can be inserted into or extracted from the notch (40),
- when the gripping member (31) is in closed position, each trunnion can only make limited movement in said notch, between a "low" position corresponding to the contact with said gripping member and a "high" position.

A pneumatic cylinder acts as the actuating system (311) associated with said gripping member, able to move it between said open and closed positions.

A pivoting L-shaped latch (320) is the moving part of the locking system (32). It features a locked position and an unlocked position, able to lock the gripping member (31) when in locked position. The pivoting axis (322) of said latch is essentially located at the junction of the two branches of the L, the first branch (321) of the L, essentially horizontal, being designed to come into contact with said trunnion when it moves from its low position toward its high position and to be driven by said trunnion, making the latch pivot toward its locked position. The second branch (325) of the L, essentially vertical, has a surface irregularity that cooperates, when said latch is in locked position, with a part in relief (313) of the gripping member (31) so that it counters all movement of said gripping member, regardless of its original position, open or closed: its lower partition (324) forms a closure stop, and its upper partition (323) forms an opening stop.

Figure 4A:
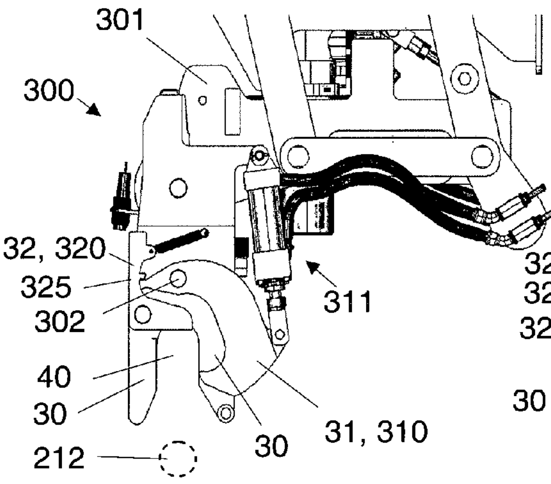
Figure 4B:
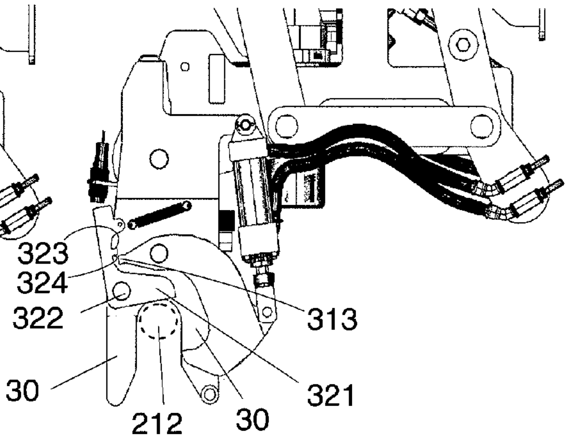
Figure 4C:
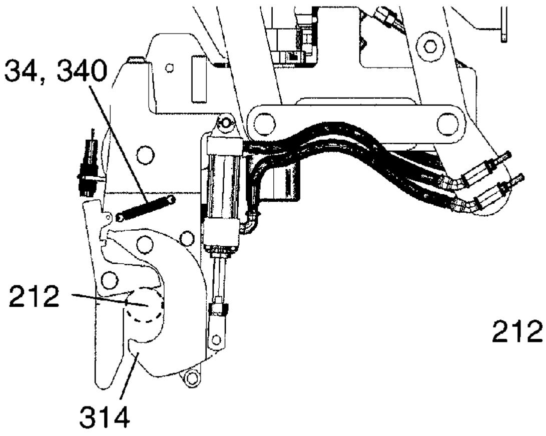
Figure 4D:
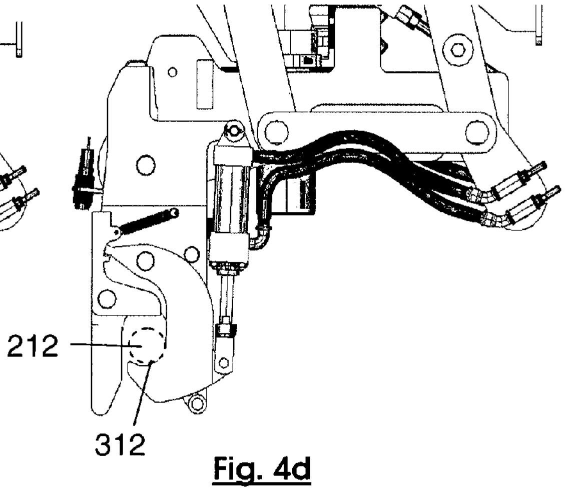
Figure 5A:
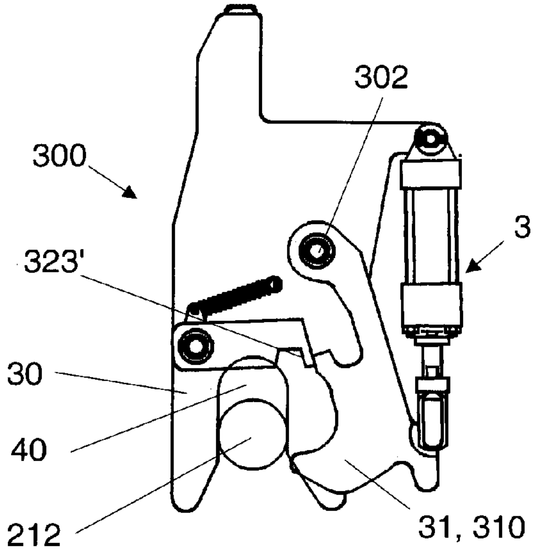
Figure 5B:
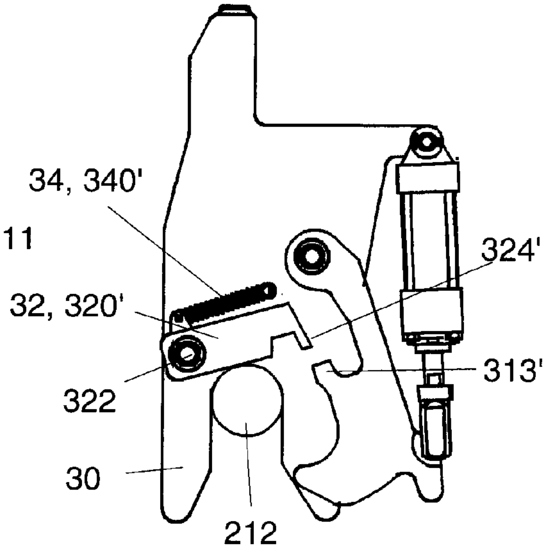
Figure 5C:
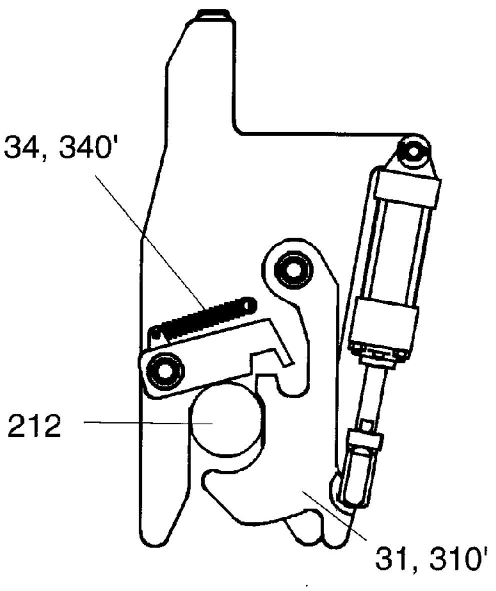
Figure 5D:
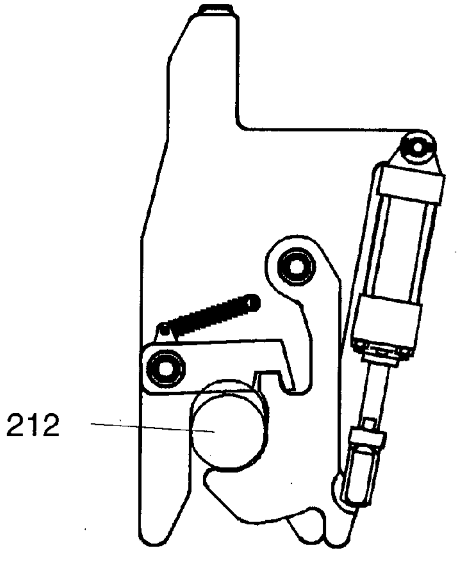
Figure 6A:
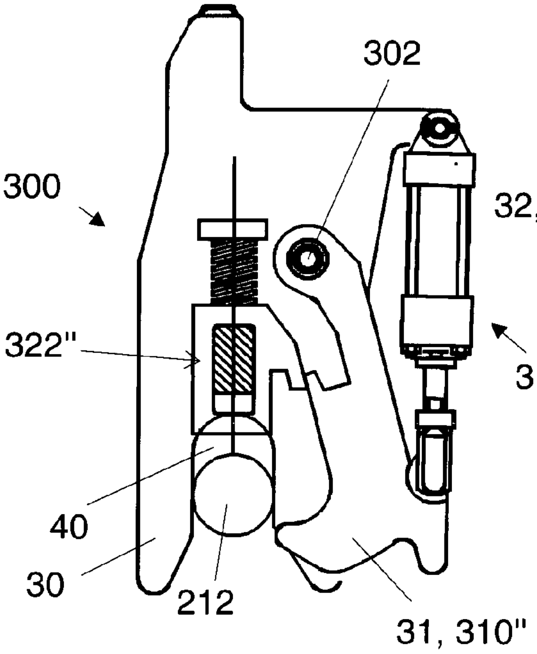
Figure 6B:
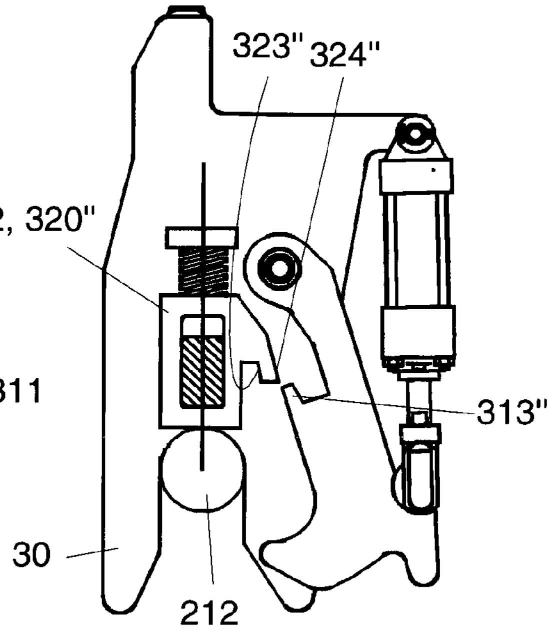
Figure 6C:
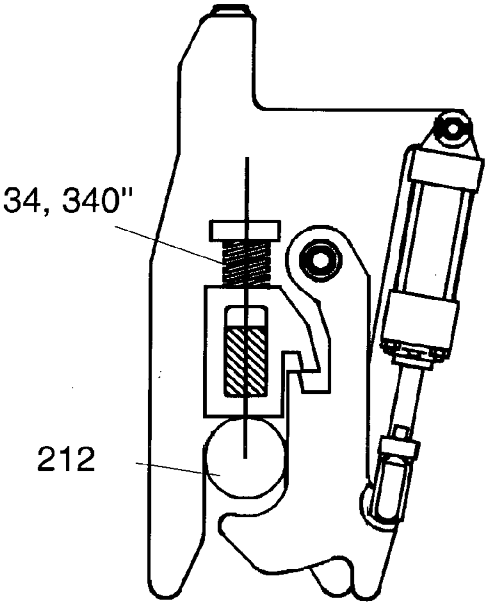
Figure 6D:
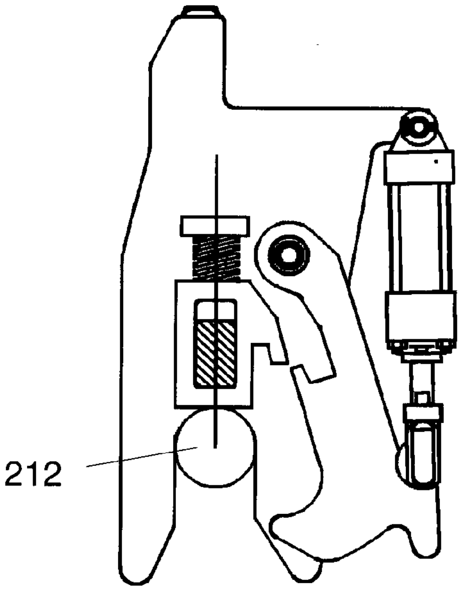
Figure 7A:
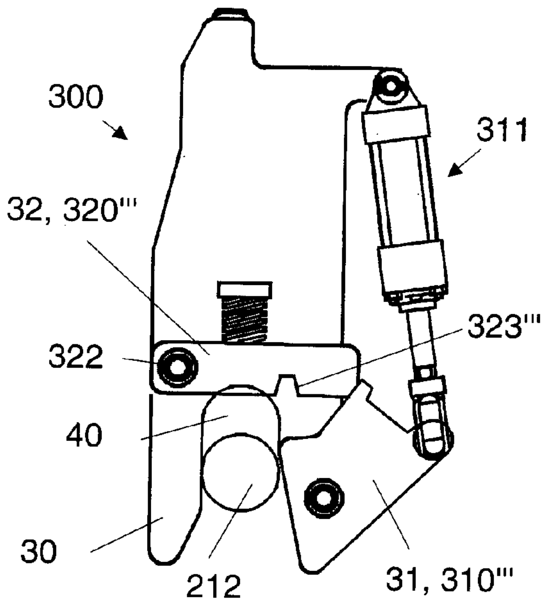
Figure 7B:
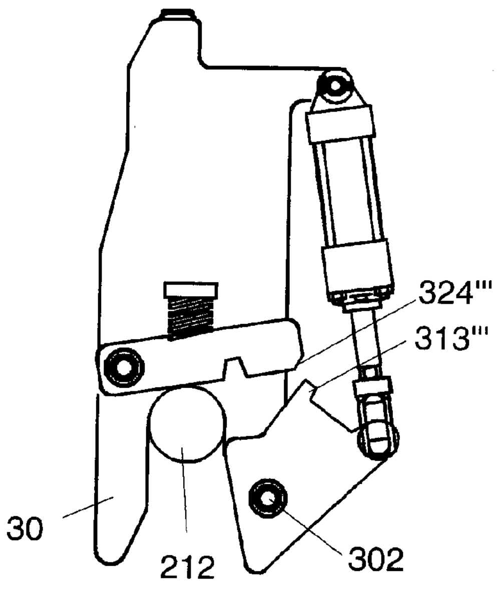
Figure 7C:
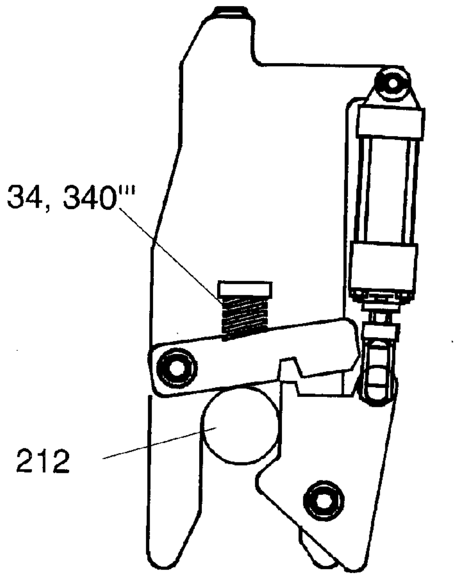
Figure 7D:
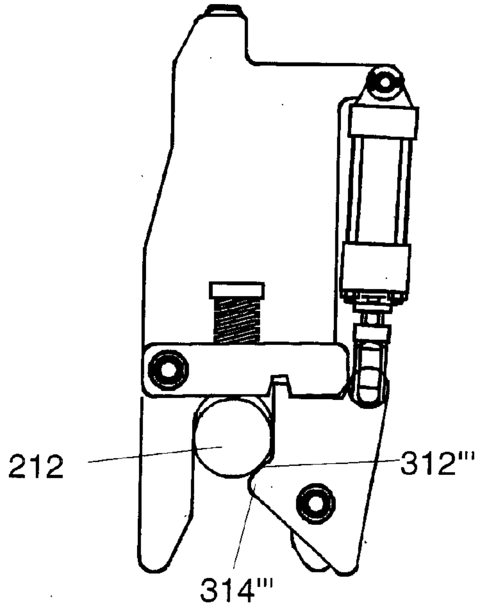

When the handling device (300) is equipped with a connector and moves in order to place it on the support hooks of the anode frame, the latch (320) is in locked position and blocks the gripping member (31) in closed position, trapping the trunnions of the connector. By gravity, the trunnions are in low position, in contact with the gripping member (FIG. 4*d*). Upon arriving above the support hooks, the handling device is lowered until the trunnions rest on said support hooks. While the gripping member continues its descent, the trunnions move and reach their high position where, coming into contact with the horizontal part of the latch, they pivot said latch while causing it to pass from its locked position to its unlocked position (FIG. 4*c*), thus enabling the gripping member to move to its open position (FIG. 4*b*) and enabling the handling device to release itself from the connector that it was transporting (FIG. 4*a*).

When the handling device (300) is empty and is moved in order to grasp a connector resting on the support hooks of the anode frame and to extract it from this position, the gripping member is maintained in open position. Upon arriving above the connector (FIG. 4*a*), which rests on the support hooks, the handling device is lowered until the trunnions are introduced into said notches and reach their high position (FIG. 4*b*) where, entering into contact with the horizontal part of the latch, they pivot said latch while passing it from its locked position to its unlocked position, thus enabling the gripping member to move from its open position to its closed position to trap said trunnions (FIG. 4*c*). The handling device is then raised so that the trunnions reach low position, which corresponds to the contact with the gripping member. While continuing the raising movement, the connector is driven by the gripping member, the trunnions resting on said gripping member (FIG. 4*d*).

An actuator (34) moves the locking system (32) from its unlocked position to its locked position when the trunnion is not in high position. Said actuator is a spring (340), connecting a fixed point of the handling device to a point of the essentially vertical branch of the L. The stiffness of the spring is sufficiently weak so that the latch can pivot when the trunnion comes into contact with the essentially horizontal part.

The gripping member (31) includes two pivoting flanges, each associated with a trunnion and driven by a cylinder to move from the open position to the closed position and vice-versa. Said flanges pivot around a pin (302). These flanges have a C-shaped contour, with a relief (313) of tongue type which cooperates with the upper partition (323) and the lower partition (324) of the latch (320) and with a protuberance (314) which forms an obstacle at the entrance of the notch, when said gripping member is in closed position. The protuberance (314) has a concavity (312) able to former a seat on which the trunnion can rest.

EXAMPLE 2

FIGS. 5*a* to 5*d*

The second example essentially differs from the first example by the latch (320'). The latter is also a pivoting L-shaped latch, with a very short substantially vertical branch, connected to a compression spring (340') and a substantially horizontal branch equipped with a slot having an opening stop partition (323') and equipped, at its end, with a closure stop partition (324').

The pin (313') of the flange (310') of the gripping system (31) cooperates with said opening stop partition to maintain the locking system (31) in locked position, said flange being blocked in closed position. The pin (313') cooperates with said closure stop partition (324') to maintain the locking system (31) in locked position, the flange (310') of the gripping system (31) being blocked in open position.

EXAMPLE 3

FIGS. 6*a* to 6*d*

The third example essentially differs from the first example by the latch (320"). The latter does not pivot: it moves vertically, guided by a slide (322"). Its upper end is connected to a compression spring (340") which tends to push it toward a low position, in which the opening stop partition (323") and the closure stop partition (324") interact with the pin (313") of the flange (310") in a manner similar to that described in the previous example.

EXAMPLE 4

FIGS. 7*a* to 7*d*

The fourth example differs from the previous examples relative to the more compact shape of the flanges (310'") of the gripping system (31). The latch (320'") pivots. A compression spring (340'") tends to push it toward a low position, in which the opening stop partition (323'") and the closure stop partition (324'") interact with the pin (313'") of the flange (310'") in a manner similar to that described in examples 2 and 3 above.

In this example, the movements of the flanges (310'") of the gripping system (31) are less ample, the seat (312'") provided to the trunnions is less extensive although the associated protuberance (314'") allows said trunnions to be trapped in the notch.

The invention claimed is:

1. A handling device of an anode connector designed to connect an anode stem onto an anode frame of an igneous electrolysis cell intended for aluminium production, said connector being equipped with two side trunnions able to cooperate with support hooks interdependent with said anode frame and placed on either side of the anode stem, so as to pin said anode stem against said anode frame, said handling device comprising at least a guiding member having a notch associated with each of said trunnions and designed to receive said trunnion, said handling device being characterized in that said handling device also includes:

at least a gripping member, having an open position and a closed position, said guiding member and said gripping member configured to cooperate in such a manner that, when said gripping member is in the open position, each trunnion can be inserted into or extracted from said notch, and when said gripping member is in the closed position, each trunnion can only move a limited distance in said notch, between a low position, corresponding to contact with said gripping member, and a high position;

an actuating system associated with said gripping member, configured for moving the gripping member between said open and closed positions; and at least a locking system having a locked position and an unlocked position, that is able to block said gripping member when in the locked position, and able to move from the locked position to the unlocked position when said trunnions are in the high position.

2. A handling device according to claim 1, characterized in that said locking system includes a moving part designed to move between two positions: the unlocked position, where said gripping member is free to move and the locked position, where said moving part prevents said gripping member from moving, said unlocked position being reached by said moving part when it is in contact with a trunnion and is configured to be driven by said trunnion as the trunnion travels toward towards the high position.

3. A handling device according to claim 1, characterized in that the handling device also includes an actuator which, when said trunnion is not in the high position, moves said locking system from the unlocked position to the locked position.

4. A handling device according to claim 3, characterized in that said actuator is an elastic means, the stiffness of which is sufficiently weak so that a mobile part of said locking system is configured to be driven by said trunnion as the trunnion moves toward the high position.

5. A handling device according to claim 1, characterized in that said gripping member includes two flanges, each associated with one of the trunnions.

6. A handling device according to claim 1, characterized in that the handling device includes two locking devices, each associated with one of the trunnions.

7. A handling device according to claim 1, in which said gripping member has, perpendicularly to a pivoting axis, a contour comprising a relief that is configured to cooperate with said locking system and a protuberance that is configured to form an obstacle at an entrance of the notch, when said gripping member is in the closed position.

8. A handling device according to claim 7, in which said protuberance has a concavity able to form a seat on which the trunnion can rest.

9. A handling device according to claim 7, in which a moving part of the locking system is equipped with a partition which, when said moving part is located in the locked position, is configured to prevent movement of said relief of the gripping member which enables movement from the closed position to the open position.

10. A handling device according to claim 7, in which a moving part of the locking system is equipped with a partition which, when said moving part is located in the locked position, is configured to prevent movement of said relief of the gripping member which enables movement from the open position to the closed position.

11. A handling device according to claim 1, in which said actuating system is a cylinder comprising a rod whose two ends of travel correspond to said open position and said closed position, respectively.

12. A handling device according to claim 1, wherein when said gripping member is in the open position and said locking system is in the locked position, said locking system is configured to block said gripping member from moving to the closed position, and when said gripping member is in the closed position and said locking system is in the locked position, said locking system is configured to block said gripping member from moving to the open position.

13. A handling device according to claim 1, wherein said actuating system is an autonomous actuating system.

14. A handling device according to claim 1, wherein said actuating system is configured for moving said gripping member between the open and closed positions independently of a position of said trunnion in said notch.

15. A handling device according to claim 1, wherein said actuating system is capable of moving the gripping member between said open and closed positions when said trunnion is in the high position, and wherein the actuating system is further capable of moving said gripping member between said open and closed positions when said trunnion is not received in said notch.

16. A lifting and handling unit comprising at least a connector handling device of an anode connector designed to connect an anode stem onto an anode frame of an igneous electrolysis cell intended for aluminium production, said connector being equipped with two side trunnions able to cooperate with support hooks interdependent with said anode frame and placed on either side of the anode stem, so as to pin said anode stem against said anode frame, said handling device comprising at least a guiding member having a notch associated with each of said trunnions and designed to receive said trunnion, said handling device being characterized in that said handling device also includes:

at least a gripping member, having an open position and a closed position, said guiding member and said gripping member configured to cooperate in such a manner that, when said gripping member is in the open position, each trunnion can be inserted into or extracted from said notch, and when said gripping member is in the closed position, each trunnion can only move a limited distance in said notch, between a low position, corresponding to contact with said gripping member, and a high position;

an actuating system associated with said gripping member, configured for moving the gripping member between said open and closed positions; and at least a locking system having a locked position and an unlocked position, that is able to block said gripping member when in the locked position, and able to move from the locked position to the unlocked position when said trunnions are in the high position.

17. A method for use with a handling device of an anode connector designed to connect an anode stem onto an anode frame of an igneous electrolysis cell intended for aluminium production, said connector being equipped with two side trunnions able to cooperate with support hooks interdependent with said anode frame and placed on either side of the anode stem, so as to pin said anode stem against said anode frame, said handling device comprising at least a guiding member having a notch associated with each of said trunnions and designed to receive said trunnion, said handling device including:

at least a gripping member, having an open position and a closed position, said guiding member and said gripping member configured to cooperate in such a manner that, when said gripping member is in the open position, each trunnion can be inserted into or extracted from said notch, and when said gripping member is in the closed position, each trunnion can only move a limited distance in said notch, between a low position, corresponding to contact with said gripping member, and a high position;

an actuating system associated with said gripping member, configured for moving the gripping member between said open and closed positions; and at least a locking system having a locked position and an unlocked position, that is able to block said gripping member when in the locked position, and able to move from the locked position to the unlocked position when said trunnions are in the high position, wherein the method comprises:

raising said trunnions from the low position to the high position, enabling said locking system to move from the locked position to the unlocked position, such that said locking system does not block said gripping member; and moving said gripping member from the open position to the closed position or from the closed position to the open position, by the actuating system.

18. A method for use with a lifting and handling unit comprising at least a connector handling device of an anode connector designed to connect an anode stem onto an anode frame of an igneous electrolysis cell intended for aluminium production, said connector being equipped with two side trunnions able to cooperate with support hooks interdependent with said anode frame and placed on either side of the anode stem, so as to pin said anode stem against said anode frame, said handling device comprising at least a guiding member having a notch associated with each of said trunnions and designed to receive said trunnion, said handling device being characterized in that said handling device also includes:

at least a gripping member, having an open position and a closed position, said guiding member and said gripping member configured to cooperate in such a manner that, when said gripping member is in the open position, each trunnion can be inserted into or extracted from said notch, and when said gripping member is in the closed position, each trunnion can only move a limited distance in said notch, between a low position, corresponding to contact with said gripping member, and a high position;

an actuating system associated with said gripping member, configured for moving the gripping member between said open and closed positions; and at least a locking system having a locked position and an unlocked position, that is able to block said gripping member when in the locked position, and able to move from the locked position to the unlocked position when said trunnions are in the high position, wherein the method comprises:

raising said trunnions from the low position to the high position, enabling said locking system to move from the locked position to the unlocked position, such that said locking system does not block said gripping member; and moving said gripping member from the open position to the closed position or from the closed position to the open position, by the actuating system.

* * * * *